United States Patent
Durvasula et al.

(10) Patent No.: US 12,548,151 B2
(45) Date of Patent: Feb. 10, 2026

(54) SYSTEMS AND METHODS FOR REMOTE OPTICAL SCREENING OF INDIVIDUALS IN ENTRYWAYS

(71) Applicant: The MITRE Corporation, McLean, VA (US)

(72) Inventors: Samir Seshu Durvasula, Rockville, MD (US); Dennis F. Gardner, Jr., Falls Church, VA (US); Elizabeth Bell Brokaw, Falls Church, VA (US); Kevin Thomas Dickey, McLean, VA (US); Michael Scott Fine, Gaithersburg, MD (US); Elyssa F. Kaplan, Middleton, MA (US); Kevin Robert Gemp, Falls Church, VA (US); Sara Leary, Reston, VA (US); Nicole Ku'ulei-lani Lape, Arlington, VA (US); Tom Apker, McLean, VA (US); Daniel Sims, McLean, VA (US)

(73) Assignee: The MITRE Corporation, McLean, VA (US)

( * ) Notice: Subject to any disclaimer, the term of this patent is extended or adjusted under 35 U.S.C. 154(b) by 420 days.

(21) Appl. No.: 18/111,312

(22) Filed: Feb. 17, 2023

(65) Prior Publication Data
US 2024/0289946 A1 Aug. 29, 2024

Related U.S. Application Data

(60) Provisional application No. 63/311,793, filed on Feb. 18, 2022.

(51) Int. Cl.
*G06K 9/00* (2022.01)
*A61B 5/00* (2006.01)
(Continued)

(52) U.S. Cl.
CPC ........ *G06T 7/0012* (2013.01); *A61B 5/02416* (2013.01); *A61B 5/0816* (2013.01);
(Continued)

(58) Field of Classification Search
CPC ......... G06T 7/0012; G06T 2207/10016; G06T 2207/30201; A61B 5/02416;
(Continued)

(56) References Cited

U.S. PATENT DOCUMENTS

| 7,787,663 B2 | 8/2010 | Hartlove |
| 8,977,347 B2 * | 3/2015 | Mestha ............. A61B 5/02405 600/479 |

(Continued)

FOREIGN PATENT DOCUMENTS

| CN | 106156757 A | * 11/2016 | ............. G06V 10/30 |
| CN | 111839492 A | * 10/2020 | ............. A61B 5/024 |

(Continued)

OTHER PUBLICATIONS

Khong et al ("Analysis of Heart Beat Rate through Video Imaging Techniques", Journal of Telecommunication, Electronic and Computer Engineering (JTEC), 8(11), 69-74. Retrieved from https://jtec.utem.edu.my/jtec/article/view/1412, 2016). (Year: 2016).*

(Continued)

*Primary Examiner* — Shervin K Nakhjavan
(74) *Attorney, Agent, or Firm* — Morrison & Foerster LLP

(57) ABSTRACT

Described herein are systems and methods for estimation of vital signs using camera data. In one or more examples of the disclosure, a RGB camera (i.e., a visible spectrum camera) can be used to collect imaging data of one or more subjects. The acquired video can be analyzed to determine the presence of a region of interest (ROI) in the field of view of the video. Using the pixel information of the identified region of
(Continued)

interest, the system and methods can estimate both heart rate and respiratory rate of a subject by observing the periodicity of change in color of the pixels in the region of interest. The change in color can be monitored by determining the power spectral density (PSD) of each pixel and monitoring the changes in PSD over time.

24 Claims, 8 Drawing Sheets

(51) Int. Cl.
  *A61B 5/024* (2006.01)
  *A61B 5/08* (2006.01)
  *G06T 7/00* (2017.01)
  *G06V 40/16* (2022.01)

(52) U.S. Cl.
  CPC .......... *A61B 5/7235* (2013.01); *G06V 40/162* (2022.01); *G06T 2207/10016* (2013.01); *G06T 2207/30201* (2013.01)

(58) Field of Classification Search
  CPC ................ A61B 5/0816; A61B 5/7235; A61B 2560/0223; A61B 5/0077; A61B 5/015; A61B 5/7221; A61B 5/7267; G06V 40/162
  See application file for complete search history.

(56) References Cited

U.S. PATENT DOCUMENTS

| | | | |
|---|---|---|---|
| 10,445,560 B2* | 10/2019 | Jones | G06T 5/50 |
| 10,939,852 B2* | 3/2021 | Guazzi | A61B 5/0077 |
| 10,970,375 B2* | 4/2021 | Shila | G06V 10/82 |
| 11,304,604 B2* | 4/2022 | DiMaio | A61B 5/0077 |
| 11,850,026 B2* | 12/2023 | Levi | A61B 5/0075 |
| 12,186,110 B2* | 1/2025 | Shivpure | A61B 5/4842 |
| 12,273,619 B2* | 4/2025 | Tomizawa | A61B 5/02416 |
| 2021/0202090 A1 | 7/2021 | O'donovan et al. | |
| 2021/0326811 A1 | 10/2021 | Chen et al. | |
| 2022/0331028 A1* | 10/2022 | Sternitzke | G05D 1/0094 |

FOREIGN PATENT DOCUMENTS

| | | | | |
|---|---|---|---|---|
| CN | 112006673 A | * | 12/2020 | A61B 5/725 |
| CN | 112364832 A | * | 2/2021 | G06F 18/214 |
| JP | 2020-77388 A | | 5/2020 | |
| WO | 2021/207283 A1 | | 10/2021 | |
| WO | 2021/247445 A1 | | 12/2021 | |

OTHER PUBLICATIONS

Babbar, Indian Patent Application No. 202011019167, filed May 5, 2020, for "A System for a Body Temperature Monitoring, Security Check and Sanitization".

Chaurasiya et al., Indian Patent Application No. 202011024968, filed Jun. 14, 2020, for "Covid Preventive Automated Entry Point (COPAEP)".

Jeyakumar et al., Indian Patent Application No. 202141019596, filed Apr. 29, 2021, for "IOT Based Smart Assist System to Monitor Entertainment Spots Occupancy and Covid 19 Screening During the Pandemic".

Rachel et al., Indian Patent Application No. 202141009957, filed Oct. 3, 2021, for "Smart Door Thermal Scanner With Touchless Sanitizer to Prevent From Covid 19".

* cited by examiner

SYSTEMS AND METHODS FOR REMOTE OPTICAL SCREENING OF INDIVIDUALS IN ENTRYWAYS

CROSS-REFERENCE TO RELATED APPLICATIONS

This application claims the benefit of U.S. Provisional Application No. 63/311,793, filed Feb. 18, 2022, the entire contents of which is incorporated herein by reference.

FIELD OF THE DISCLOSURE

This disclosure relates to using camera data (both thermal and visible spectrum) to determine various vital signs and conditions of a human subject without requiring any physical contact with the subject being analyzed.

BACKGROUND OF THE DISCLOSURE

Public health concerns such as the COVID-19 outbreak have intensified the need to perform large-scale health surveillance on individuals in public settings such as airports, office buildings, and businesses, in an effort to prevent ill or symptomatic individuals from entering a public space where they may come into contact with numerous individuals in close proximity and thus potentially spread the virus that that they are infected with. Conventional health screening tools often require a device to be used on a single subject at a time, requiring a screener to remain in close proximity to individuals being screened. For instance, a thermometer requires a device to either be placed on or near the individual being assessed to capture temperature data about the subject which can be used to assess whether the person may be symptomatic viral infection. The process of placing a device on or near a subject can create a "bottleneck" where subjects are required to queue and wait until they can be tested, and thus may frustrate efficient operation of public spaces. This may also facilitate the spread of infectious disease, as screeners must be close to an individual to perform screening.

Furthermore, devices like a thermometer may only present a single metric of illness and thus may not present a holistic and accurate assessment of a subject's symptoms or likelihood of infection. Thus, using devices that are often invasive and require the subject to specifically present themselves to the device may not be practical in certain situations and furthermore may not be as accurate as desired.

Rather than requiring subjects to present themselves to a device for testing, a device that can casually assess subjects (i.e., without requiring them to specifically present themselves to the devices) can prove to be a useful tool. Cameras (such as thermal or visible spectrum) are examples of surveillance tools commonly employed in public spaces to monitor public spaces, often for security and public safety purposes. Cameras casually obtain data about a subject in the sense that the subject merely needs to appear in the field of view of the camera to be observed. Given their prevalence of use in public spaces, and their ability to collect data on subjects remotely, using cameras or other optical devices to collect information about a subject would be useful so long as the camera data could be collected and utilized in a manner that would yield accurate results regarding the assessment of illness in a subject.

SUMMARY OF THE DISCLOSURE

Described herein are systems and methods for estimation of vital signs using camera data. In one or more examples of the disclosure, a RGB camera (i.e., a visible spectrum camera) can be used to collect imaging data of one or more subjects. In one or more examples, the acquired video can be analyzed to determine the presence of a region of interest (ROI) in the field of view of the video. Using the pixel information of the identified region of interest, in one or examples, the system and methods can estimate both heart rate and respiratory rate of a subject by observing the periodicity of change in color of the pixels in the region of interest. In one or more examples, the power spectral density of each pixel can be determined. Subsequently or in parallel, a background power spectral density can also be computed. In one or more examples, the background power spectral density can be subtracted from each pixel power spectral density to remove effects of background noise from the computation. In one or more examples, the resultant background compensated power spectral density can be analyzed to determine a plurality of peaks within particular frequency ranges correlating to a human heart rate and/or human respiratory rate. In one or more examples, a "voting" method can be invoked for all of the pixels in the region of interest to determine the likely heart rate and/or respiratory rate of the subject being analyzed. In one or more examples, the RGB camera data can be coupled with a thermal camera to also determine the respiratory and heart rate of a subject.

Additionally or alternatively, heart rate and respiratory rate can be calculated using alternative processing methods for camera data. For instance, in one or more examples, a thermal camera can leverage the pixels surrounding the mouth and nose of a subject to determine respiratory rate and/or heart rate when the subject is wearing a facial covering. In one or more examples, when a subject inhales, the material covering the nose and mouth cools, and upon exhale, heats up. Thus, in one or more examples, the thermal camera can capture those changes over time to estimate respiratory rate.

In one or more examples, determining a region of interest in a video image/frame can include utilizing one or more machine learning classifiers that is are collectively configured to perform pose estimation to segment a subject's face from an image taken of their body. In one or more examples, one or more machine learning classifiers can identify the location of various landmarks of the human body such as the arms, legs, etc., to ultimately determine a region of interest to segment from the image for further analysis.

In one or more examples, the respiratory rate and heart rate obtained using the methods described above can be used to adjust temperature readings obtained from a thermal camera of a subject to more accurately determine the probability of illness in the subject. In one or more examples, demographic estimation from a frontal face image (i.e., age, gender, skin-tone, BMI) can be used to adjust any body temperature or heart rate calculations to account for demographic bias.

In one or more examples, in support of the use of a thermal camera for performing optical remote sensing of subjects, the systems and methods can include a process for in-scene automatic location of a blackbody temperature reference. In one or more examples, a "blackbody" reference can refer to a radiator that is optically "black," (i.e., non-reflective, with an emissivity of 1 or nearly 1.) In one or more examples, the process can begin with a one or more grayscale thermal images, pre-scaled for display. In one or more examples, the images can be convolved with one or more averaging kernels of varying size to find the (x, y) coordinates of a global maximum output across all convolutions that corresponds approximately to the center of the blackbody. In one or more examples, a nonuniform quantization algorithm is a applied to the image, dividing the image into optimally spaced bins to provide a minimum-error reconstruction of the full-range. The number of quantization bins can be based on scene variance; scenes with wide temperature ranges require more quantization bins to account for more scene content. In one or more examples, using the (x,y) coordinate estimate of the blackbody from above as a starting point, the systems and methods described herein can sample a 5×5 neighborhood in the quantized image, assigning the blackbody's class to the most common class in that neighborhood. In one or more examples, in the event of a tie, the class of the blackbody can be assigned as the highest-valued class, corresponding to the highest temperature in that local area. From this class, an image mask can be created, applying morphological operations to result in only the boundary edges of the blackbody. A flood-fill algorithm provides a filled region that roughly corresponds to the blackbody. With a reasonable approximation of the area of the blackbody, the systems and methods can determine the rectangular bounding box that is best inscribed in it. The result of this process can be four points corresponding to the edges of the bounding box drawn around the blackbody, with an estimated centroid based on the locations of the bounding box.

In one or more examples, the systems and methods described herein can include a process for performing temperature calibration of the thermal cameras so as to provide accurate temperature estimates. In one or more examples, the system can use a dual blackbody calibration to provide time-independent, accurate, and absolute temperature measurements that could be applied in clinical settings. The typical low-cost thermal imager—a microbolometer array—is generally not temperature-stabilized, and its output signal is dependent on its own temperature. Thus, as ambient temperatures change, the camera will return different (and, frequently, incorrect) temperatures, diminishing both the accuracy and precision of these systems over time. In one or more examples, the system can include thermal imagers that are temperature-calibrated using two blackbodies: one fixed at a reference temperature (typically 37° C.), and a second used to build the calibration curve. The second blackbody can be used to generate a "step" function of temperatures for calibration, operating in a set-and-hold mode between 35 and 43° C. in steps of 0.2° C. During calibration, the fixed blackbody is used to compensate for the temperature-variant shifts in the thermal camera's output. A calibration curve is then fit as a quadratic to the reference-subtracted output of the camera at every temperature step of the time-variant blackbody, converting camera digital numbers (DN) into temperature given a reference source. The constant term of the quadratic is set to the reference temperature to minimize error around that point, forcing the solver to optimize the gain terms in the vicinity of the reference. This approach improves accuracy for human body temperature screening applications, where average body temperatures tend to cluster around the reference temperature. In one or more examples, the dual-blackbody calibration can be performed in an automated process in a lab or production environment before deployment and setup, or it can be performed with in-scene dual blackbodies for an on-the-fly calibration process that can be repeated intermittently to compensate for camera drift over time. Because of its reliance on the reference blackbody to pin the camera's output to known temperature, it is robust to both changes in ambient and camera temperature, as well as distances from the thermal camera to its reference blackbody in a temperature screening scenario.

BRIEF DESCRIPTION OF THE FIGURES

The invention will now be described, by way of example only, with reference to the accompanying drawings, in which.

DETAILED DESCRIPTION OF THE DISCLOSURE

Figure 1:
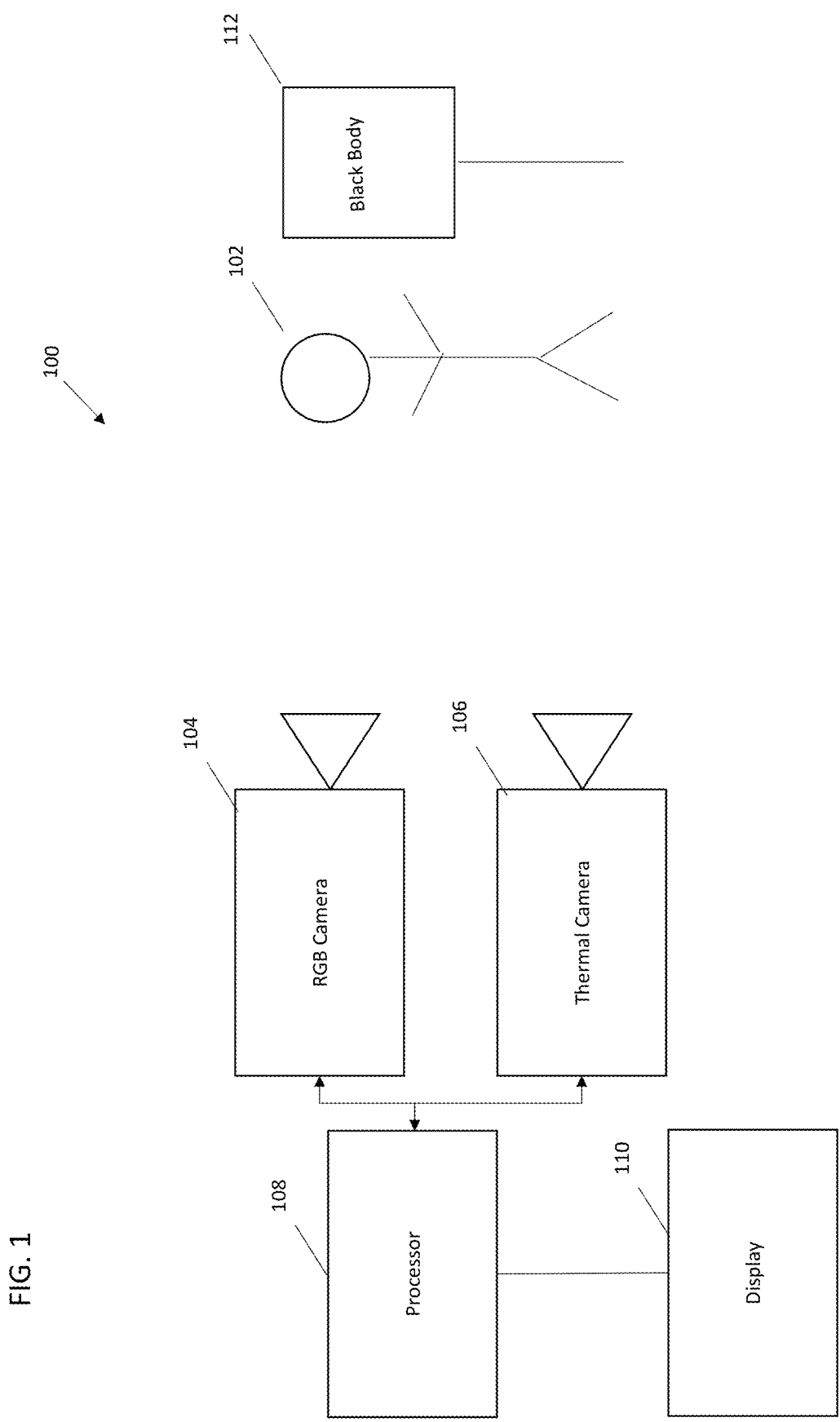
FIG. 1 illustrates an exemplary system for performing remote optical screening according to examples of the disclosure.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present disclosure as described herein.

Cameras are ubiquitous in wide-area monitoring such as surveillance and screening. By passively scanning a scene, a camera can collect image data on any subject that passes through its field of view. Images are not limited to their spatial content and can be used to extract further information about subjects that pass through the field of view of the camera. As described in detail below, the use of cameras and image processing algorithms can be applied to perform health screenings, which may allow entities such as businesses, healthcare facilities, or government institutions to reduce the spread of infectious disease.

FIG. 1 illustrates an exemplary system for performing remote optical screening according to examples of the disclosure. In one or more examples, the system 100 of FIG. 1 can represent a system that is configured to perform health related monitoring on a plurality of subjects 102 using camera image data. In one or more examples, the system 100 can include a RGB camera (i.e., visible spectrum camera) 104. RGB camera 104 can comprise a visible spectrum camera that collects image data from an image sensor and converts the image data into a digital representation. In one or more examples, the digital video data collected can be represented as a series of frames, wherein each frame represents a specific moment in time captured by the camera. In one or more examples, RGB camera 104 can be implemented as a still camera wherein the camera captures a single frame of data at a time, or it can be implemented as a continuous video camera that can capture image data in real-time (i.e., a video stream such as H.264, MPEG, etc.) In one or more examples, each frame of the image data can include a plurality of pixels. Each pixel of the frame can represent a geometric area of the image. A single image can thus include numerous pixels, with each pixel representing a specific portion of an image captured. In one or more examples, each pixel can include a plurality of digital values, with each value representing a different color. For instance, the RGB camera 104 can represent a pixel using three values, one for red, one for green, and one for blue. The amount of red, blue, and green, can be represented by the value corresponding to that color. Thus, in one or more examples, any color can be represented digitally as a specific combination of values of red, green, and blue.

In one or more examples, the system 100 can also include a thermal camera 106. While RGB camera 104 can collect data in the visible spectrum, thermal camera 106 can collect image data in the infrared (IR) spectrum. In one or more examples, thermal camera 106 can also collect frames of image data similar to RGB camera 104, but each pixel in a thermal camera image frame can represent the amount of infrared radiation that is emitted. Thus, each pixel in a thermal camera image can represent the amount radiation being emitted at a particular location within the field of view of the thermal camera 106.

In one or more examples, the system 100 can include a blackbody reference 112. In one or more examples, blackbody reference 112 can provide the thermal camera 106 with a reference level amount of blackbody radiation that can be used to determine the temperature of a subject being viewed by thermal camera 112. For instance, blackbody reference 112 can be configured to emit heat at a particular and specific temperature. Thermal camera 106 can capture an image that includes both the subject 102 and the blackbody reference 112. Using the pixel values in the location corresponding to the blackbody reference 112, the thermal drift of the infrared camera 106 can be corrected and a temperature lookup table applied, so as to estimate the temperature of the subject 102.

In one or more examples, the system 100 can include a processor 108. Processor 108 can be configured to receive image data from both RGB camera 104 and thermal camera 106. In one or more examples, processor 108 can be configured to perform a variety of processing algorithms that are used to convert the acquired image data from both cameras 104 and 106, and determine one or more metrics associated with the subject 102. Additionally, processor 108 can be configured to perform camera alignment, and can configure blackbody references. In one or more examples, processor 108 can also create video overlays for display 110 (described in further detail below).

In one or more examples, system 100 can include a display 108 that can be communicatively coupled to processor 108. In one or more examples, display 108 can be configured to display the temperature, heart rate, respiratory rate for screened subjects 102 provided to it by processor 108. In one or more examples, display 110 can be configured to also display any video overlays provided to it by processor 108.

The system 100 of FIG. 1 can be used to collect both thermal and visible camera data and utilize the data to make determinations about the health of a subject. For instance, the thermal camera 106 can be used to determine the temperature of a subject. In one or more examples, if the temperature of a subject is found to be above a predetermined threshold, then it is likely that the subject may be ill. However, temperature alone may not be a reliable indicator of health. For instance, if a subject has engaged in any moderate exercise prior to taking a temperature reading, then their temperature may be elevated without them being ill. Thus, in one or more examples, using temperate data alone may not reliably predict illness in a subject. However, if temperature is used with other indicators of health, then it may serve as a more reliable indicator of health. For instance, in one or more examples, if a person has moderately exercised, then they may have an elevated heart rate and/or respiratory rate. Thus, if an elevated temperature reading is accompanied by an elevated respiratory rate and/or heart rate, then the elevated reading may not indicate illness. Thus, using the camera system 100 described above, the image data can be analyzed to determine the subject's heart rate and respiratory rate, so as to provide a more comprehensive overview of the subject's health.

Figure 2A:
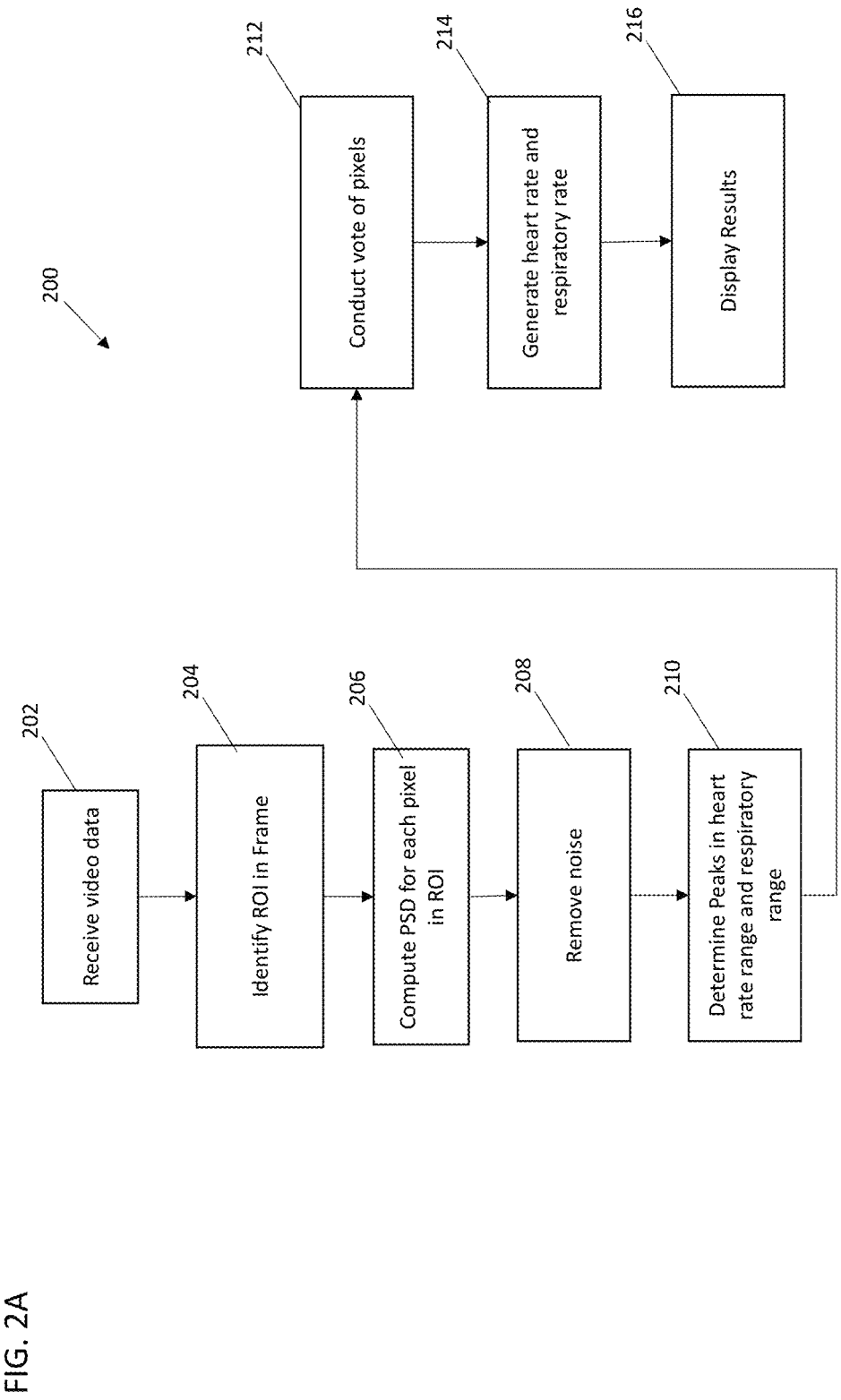
FIG. 2A illustrates an exemplary process for processing RGB camera data to determine a subject's heart rate and respiratory rate according to examples of the disclosure.

FIG. 2A illustrates an exemplary process for processing RGB camera data to determine a subject's heart rate and respiratory rate according to examples of the disclosure. In one or more examples, the process 200 of FIG. 2A can begin at step 202 wherein video data is received. In one or more examples, the received at step 202 can be received from an RGB camera such as RGB camera 104 described above with respect to FIG. 1. In one or more examples, and as described above, each image frame of the received video can include a set of pixels, with each pixel containing a red channel (i.e., red value), a blue channel, and a green channel representing the mixture of red, blue, and green contained within the pixel. In one or more examples, the video data received at step 202 can be represented as a plurality of frames, with each frame representing a discrete moment in time when the image was captured by the camera.

In one or more examples, once the video data has been received at step 202, the process 200 can move to step 204 wherein a region of interest in the received data is identified. In one or more examples, a region of interest can comprise a subset of the pixels in the video data corresponding to an area of a subject's body to be analyzed for heart rate and respiratory rate. As discussed in further detail below, in one or more examples, a region of interest can be identified using one or more machine learning classifiers. In one or more examples, the region of interest identified at step 204 can include a neck area of the subject being analyzed for the purpose of determining the respiratory rate of the subject. In one or more examples, the region of interest can also include the pixels pertaining to the cheek, forehead, or neck of the subject for the purpose of determining the heart rate of the subject. In one or more examples, both the heart rate and respiratory rate can be determined using the same region of interest. In one or more examples, the region of interest identified at step 204 can pertain to any portion of the subject under test's anatomy that is likely to change color when a subject inhales and exhales oxygen and/or a portion of the subject's body that is likely to change color when the subject's heart contracts and/or dilates. As described in further detail below, by determining the rate of change of colors in the region of interest, the heart rate and/or respiratory rate of the subject can be determined.

In one or more examples, once the region or regions of interest have been identified at step 204, the process 200 can move to step 206 wherein a power spectral density (PSD) for each pixel in the region of interest can be calculated. In one or more examples, each pixel of a video can vary in their color as a function of time. For instance, a region of interest can vary in color due to a subject breathing in (and thus oxygenating their blood) and a subject breathing out (thus releasing the oxygen from the blood.) Likewise, colors in a region of interest can also vary as a subject's hearts dilates and contracts. By taking a PSD of each pixel in the region of interest, the variations in color of each pixel over time can be converted into the frequency domain for analysis. In one or more examples, each color channel (RGB) can have its own PSD. Thus, each individual pixel can have three separate PSDs generated for it. In one or more examples, a subset of the color channels can be used to generate PSDs. In one or more examples, upon the completion of step 206, each pixel can have one or more PSDs generated, which represent the variation in a color channel of a pixel in the frequency domain.

In one or more examples, once the PSDs for each pixel has been generated at step 206, the process 200 of FIG. 2A can move to step 208 wherein noise found in each PSD can be removed or minimized to ensure that the PSD can be used reliably to generate accurate results. In one or more examples, removing noise at step 208 can include taking a PSD of a background region of the image (not pertaining to the subject) and subtracting the PSD of the background region from each PSD in each (pixel, color channel) pair of the PSDs generated at step 206. In one or more examples, by subtracting a PSD of the background region, any variation in color of the subject's region of interest attributable to background noise (i.e., changes in light, etc) may be removed so that it doesn't engender erroneous interpretations of the PSD of the regions of interest of the subject being analyzed.

In one or more examples, once the background noise has been removed or minimized at step 208, the process 200 can move to step 210 wherein each of the PSDs pertaining to the region of interest can be analyzed to determine the presence of one or more peaks. Since a PSD can represent the rate of change of a pixels color in time in the frequency domain, each peak in the PSD can represent the frequency in change of a particular color channel. Thus, in one or more examples, and at step 210, the PSDs can be analyzed to determine where the largest peaks in the PSD occur. Since a PSD will likely have multiple peaks spread across multiple frequencies, in one or more examples, a specific region of the PSD can be analyzed to determine a peak within that region. For instance, a normal respiratory rate can be anywhere from 5-30 breaths per minute. Thus, by looking for the peaks in the region of the PSD pertaining to 5-30 breaths per minute, the highest peak found in that region will likely pertain to the subject's breathing rate. Likewise, the human heart beats between 40 and 240 beats per minute. Thus, the highest peak between 40 and 240 beats per minute will likely pertain to the subject's heartbeat. In one or more examples, and for each pixel, step 210 can include collecting the strongest Np peaks within each of the resting state heart rate band (40-240 beats per minute) and respiratory bands (5-30 breaths per minute). In one or more examples, Np can be equal to 3.

Once the peaks have been determined at step 210, the process can move to step 212 wherein a vote procedure is implemented to determine the heart rate and respiratory rate of the subject under test. In one or more examples, all of the peaks from each of the PSDs can be polled to determine what frequency or frequencies the majority of the peaks fall at. Ideally, each PSD would see peaks at the exact same frequency values (since they all pertain to the same subject) however due to noise and other phenomenon, there may be variation. Thus at step 212, each PSD can be polled to determine where its peak in the respiratory band is, and where its peak in the heartbeat band is. Each PSD can count as a vote, and the respiratory rate and heart rate that garners a majority can be declared the winner, meaning that value is likely the value pertaining the user's respiratory rate and breathing rate respectively. Thus, once the vote of the pixels has been conducted at step 212, the process 200 can move to step 214 wherein the winner of the vote at step 212 can be used to generate the final determination of the heart rate and respiratory rate of the subject being analyzed. Additionally or alternatively, the PSD computed at step 206 and filtered at step 208 can be used to determine other metrics of human health such as blood pressure at step 214. In one or more examples, the heartrate and respiratory rate determined at step 214 can also be used to determine other information about the state of a subject being tested such as the emotional state of the subject. For instance, if a subject is found to have an elevated respiratory rate and heartrate, then the system can also conclude at step 214 that the subject may be in a heightened emotional state commensurate with anger or anxiousness.

In one or more examples, the process 200 described above with respect to FIG. 2A can be performed using a thermal camera, alternatively or in addition to the RGB camera as described above. For instance, in one or more examples, process 200 can leverage a thermal camera and a traditional color camera. Either camera can be used to calculate the respiratory rate. In one or more examples, the thermal camera 106 can leverage the pixels surrounding the mouth and nose to determine the respiratory rate. In one or more examples, when a subject wearing a facial covering inhales, the material covering the mouth and nose facial region cools, and upon exhale, heats up. Thus, the thermal camera can capture those changes over time to estimate respiratory rate using the techniques described above with respect to process 200 of FIG. 2A. In one or more examples, when the subject is wearing a mask, this thermal technique can be especially effective, as the entire masked region cools and heats upon inhalation and exhalation respectively. Combining the results from two different respiratory rate and/or heart rate measurements can provide a more accurate assessment for both metrics. In one or more examples, and as described below, the systems and methods can utilize one or more machine learning classifiers to determine the location of a user's face in an image. If the machine learning classifiers show that a subject is facing the cameras, then both methods (i.e., using the RGB camera and thermal camera) can be combined to improve the accuracy.

In one or more examples, the heart rate and respiratory rate generated at step 214 can be used in combination with temperature data to determine a subject's potential for illness. In one or more examples, health screening stations may only take temperature to get a binary assessment of illness. Temperature alone may be an unreliable indicator of illness. However, accurate thermal screening may not itself be a reliable indicator of illness in all scenarios. For instance, consider a subject exercising in a warm environment, who may have an elevated temperature due to the ambient temperature and their exercise. Thus, if a determination of illness is based solely on the temperature reading, the subject may be erroneously determined to be ill. Thus, in one or more examples, the breathing rate and hear rate data generated above can be used calculate an "adjusted" temperature that can better predict illness. A person whose heart is beating fast and who is breathing heavily may have an elevated temperature, and thus any determination of illness based on temperature can be adjusted to account for the heart rate and breathing rate determined using the process 200 described above.

Figure 2B:
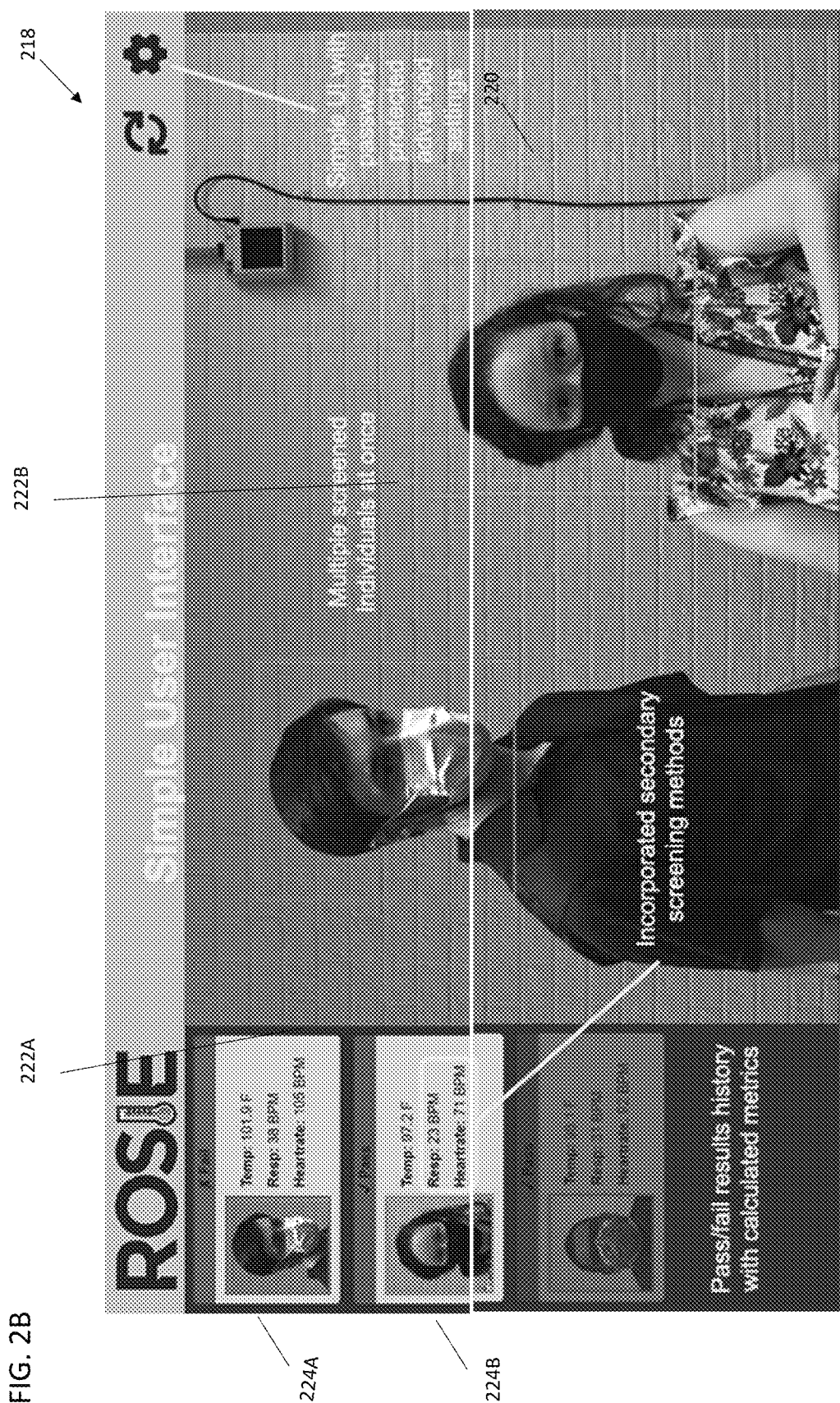
FIG. 2B illustrates an exemplary graphical user interface for providing determinations of respiratory rate and heart rate according to examples of the disclosure.

In one or more example, the process 200 of FIG. 2A, after a determination of the user's heartrate and respiratory rate are made, at step 214 can move to step 216 wherein a graphical user interface is provided at an electronic display that allows for the user of the system to quickly and efficiently correlate a subject with their generated data. FIG. 2B illustrates an exemplary graphical user interface for providing determinations of respiratory rate and heart rate according to examples of the disclosure. In one or more examples, the graphical user interface (GUI) 218 of FIG. 2B can include a screen shot or real-time image from one or more cameras associated with the system (described above) as illustrated at 220. In one or more examples, the GUI 218 can include one or more bounding boxes 222A and 222B that can identify where a particular subject is in the screenshot 220. The GUI 218 can include multiple bounding boxes, with each bounding box being associated with a particular user. In one or more examples, each of the bounding boxes can be displayed using a different color so as to differentiate separate subjects appearing in a single screenshot 220. For instance, bounding box 222A can be displayed in a different color than bounding box 222B so as to indicate different subjects in the same screenshot 220.

In one or more examples, data associated with each of the subjects can be displayed on the GUI 218 as indicated at 224A and 224B. In one or more examples, each user associated with a bounding box 222A and bounding box 222B can have their data displayed separately. For instance, the user associated with bounding box 222A can have their data displayed at 224A. Likewise, the user associated with bounding box 222B can have their data (including respiratory, heartrate, and temperature) displayed at 224B. In one or more examples, the data displayed at 224A and 224B can be highlighted using the colors of the bounding boxes they are associated with. For instance, if bounding box 222A is displayed in green, then the data associated with the subject associated with bounding box 222A displayed at 224A can be highlighted in green so as to allow the user viewing the data to efficiently associate the data with the subject in the screenshot 220.

As discussed above, determining a region of interest to perform an analysis on can be crucial to getting accurate results. That is because only certain parts of the human body will change their color in response to the beating of the heart or breathing in and out. One way to identify a region of interest is to have a user manually identify it from video data, but this approach is inefficient and prone to error. Thus, in one or more examples, the region of interest can be determined using an automated process that utilizes one or more machine learning classifiers to identify the region of interest.

Figure 3:
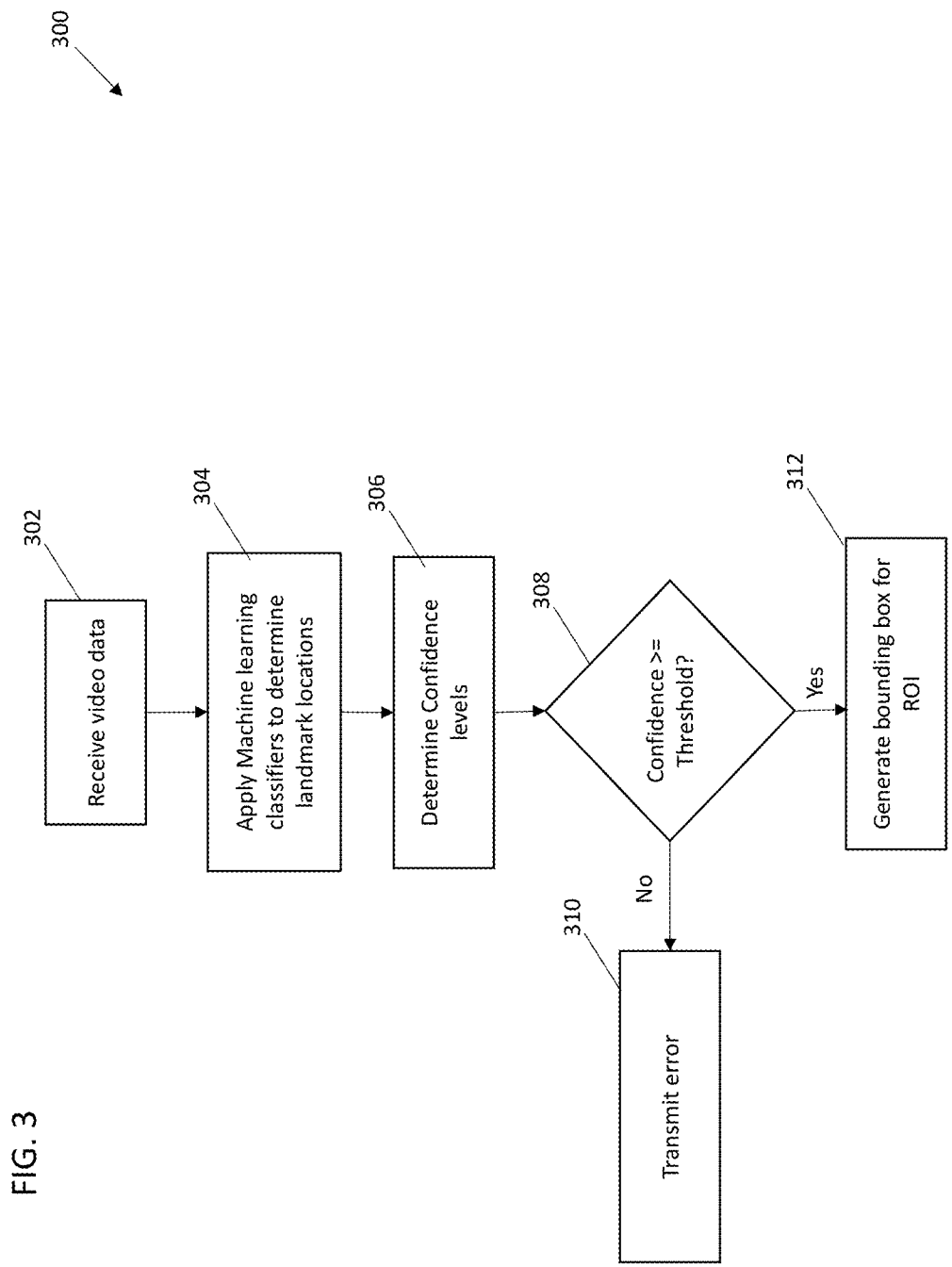
FIG. 3 illustrates an exemplary method for determining a region of interest in an image of a subject under test according to examples of the disclosure.

FIG. 3 illustrates an exemplary method for determining a region of interest in an image of a subject under test according to examples of the disclosure. In one or more examples, the process 300 of FIG. 3 can begin at step 302 wherein video data can be received. The process of receiving the video data can be substantially similar to step 202 of FIG. 2A. In one or more examples, once the video has been acquired at step 302, the process 300 can move to step 304 wherein one or more machine learning classifiers can be used to identify specific landmarks pertaining to the human anatomy from image data. In one or more examples, and in the case of facial coverings, as are necessary during COVID-19, normal face detectors may not be sufficient since the face may be obscured by the covering. Thus, in one or more examples, the machine learning classifiers used as part of step 304 can utilize full-body pose detection to generate the face region-of-interest (ROI). Using a pre-trained neural network, in one or more examples, the one or more machine learning classifiers can a subject's pose by identifying individual joints and segments associated with the human body. The use of the more advanced pose detector allows the system to more accurately determine the regions-of-interest for sampling, to provide data for the biometric algorithms.

In one or more examples, the machine learning classifiers can also be used to determine the optical flow and/or motion of the subject being tested. In one or more examples, the specific anatomical landmarks identified by the machine learning classifiers can be monitored over time to have the optical flow calculated thus determining if the user is moving during the process and/or the amount of motion. In one or more examples, if the optical flow of the subject is determined to exceed a certain pre-determined threshold, then feedback can be given to the user to remain still or reduce their motion so that a more accurate measurement of temperature or other metric can be made. In one or more examples, the optical flow determined at step 504 can be a factor that is used to generate a confidence score (see discussion below).

In one or more examples, the machine learning classifiers can also be used to determine a body mass index (BMI) of the subject. For instance, in one or more examples, the machine learning classifiers can not only detect specific anatomical regions of a subject being analyzed, but also can determine the size of the features to determine an approximate BMI of the subject. In one or more example, the determined BMI of the subject can be used to normalize the measured temperature and heartrate of the subject. For instance, a subject whose BMI is in the "obese" range may be expected to have an elevated heart rate and respiratory rate as a baseline and thus, when determining whether a subject is ill based on heartrate and respiratory rate, the subject's BMI can be taken into account when that determination is made.

In one or more examples, once the machine learning classifiers have been applied to the received video data at step 304, the process 300 can move to step 306 wherein the confidence levels for each determined (by the machine learning classifiers). In one or more examples, the one or more machine learning classifiers can be configured to determine the location of various body parts including but not limited to: the nose, left eye, right eye, left ear, right ear, left shoulder, and right shoulder within an image. In one or more examples, a separate machine learning classifier can be used for each body part, or alternatively a single classifier could be used to identify multiple body parts in an image. In one or more examples, each classifier can output a set of pixels pertaining to the identified body part. Additionally, each machine learning classifier can output a confidence score indicating a confidence level of each identification. For instance, in one or more examples, a confidence score can be from 0 to 1, with a 0 indicating no confidence and a 1 indicating a 100% confidence that the feature pertaining to the classifier is present. Thus at step 306, the confidence scores for each body part are determined, and as discussed below can be used to determine a region of interest.

In one or more examples, once the confidence levels have been determined at step 306, the process 300 can move to step 308 wherein one or more of the confidence levels generated at step 306 can be compared against a pre-determined threshold. In one or more examples, in order to generate a face bounding box (discussed in detail below), the confidence score pertaining to the identification of various landmarks that can help locate the face (i.e., nose, eyes, ears, and shoulders) should be identifiable with at least 50% confidence. Otherwise, a low confidence in these landmark metrics, can lead to misidentification of the face and thus lead to inaccurate results of the overall analysis. In one or more examples, if the classification metrics of interest are below a pre-determined threshold than the process 300 can move to step 310 wherein an error message is transmitted by the system indicating that a region of interest could not be identified.

In one or more examples, if the confidence scores are above the pre-determined threshold, then the process 300 can move to step 312 wherein a bounding box for the region of interest is generated based on the determined location of the landmarks determine at steps 304 and 306. In one or more examples, the neckline can be defined as the midpoint of the shoulders. From these coordinates, the golden ratio of the face can be used to create a bounding box. In one or more examples, the width of the bounding box can be set to be slightly wider than the largest distance between two points in the x axis (the distance between the two ears if a subject is facing the camera), with the minimum and maximum coordinates being those points moved further in their respective x-direction. In one or more examples, the height of the bounding box can be calculated using golden ratios from neckline. In one or more examples, the cartesian distance, dist, between the points that make up the neck can be calculated. In one or more examples, the minimum y coordinate can be set to $Point0_y-(dist*0.5*c)$, where $Point0_y$ is the y-coordinate of the nose and c is a tuning coefficient greater than 1 to provide an optimal bounding box for the detected face. In one or more examples, the height of the box can be calculated as $0.5(dist+(dist*c))$. In one or more examples, generating the actual bounding box can include rounding these coordinates and heights to the nearest integer. Using the minimum x coordinate, minimum y coordinate, width, and height provided all the information necessary to generate and plot a facial bounding box. An advantage of this method is that even when face coverings obscure key facial features, the above process has been shown to yield high detection confidence. In one or more examples, a user can move during analysis which means that the ROI can also move during the capturing of image data, and thus in one or more examples facial features and their associated ROI can be tracked across video frames to ensure that the ROI presented for purpose of analysis is consistent across video frames.

Referring back to the example of process 200 of FIG. 2A, steps 206-214 represent one way in which to calculate heart rate and respiratory rate from video data; however in one or more examples, the system 100 can also implement alternative methods for determining a subject's heart rate and/or breathing rate. While determining a heart rate or breathing rate of a subject from camera data can be useful, it may also be necessary to determine a confidence level in the assessment so that any results from the analysis can be assessed to determine its likelihood of accuracy. Thus, in one or more examples, the process described above with respect to steps 206-214 of process 200 can also include one or more additional steps to assess the confidence of each heartrate and breathing rate estimate generated by the process 200.

Figure 4:
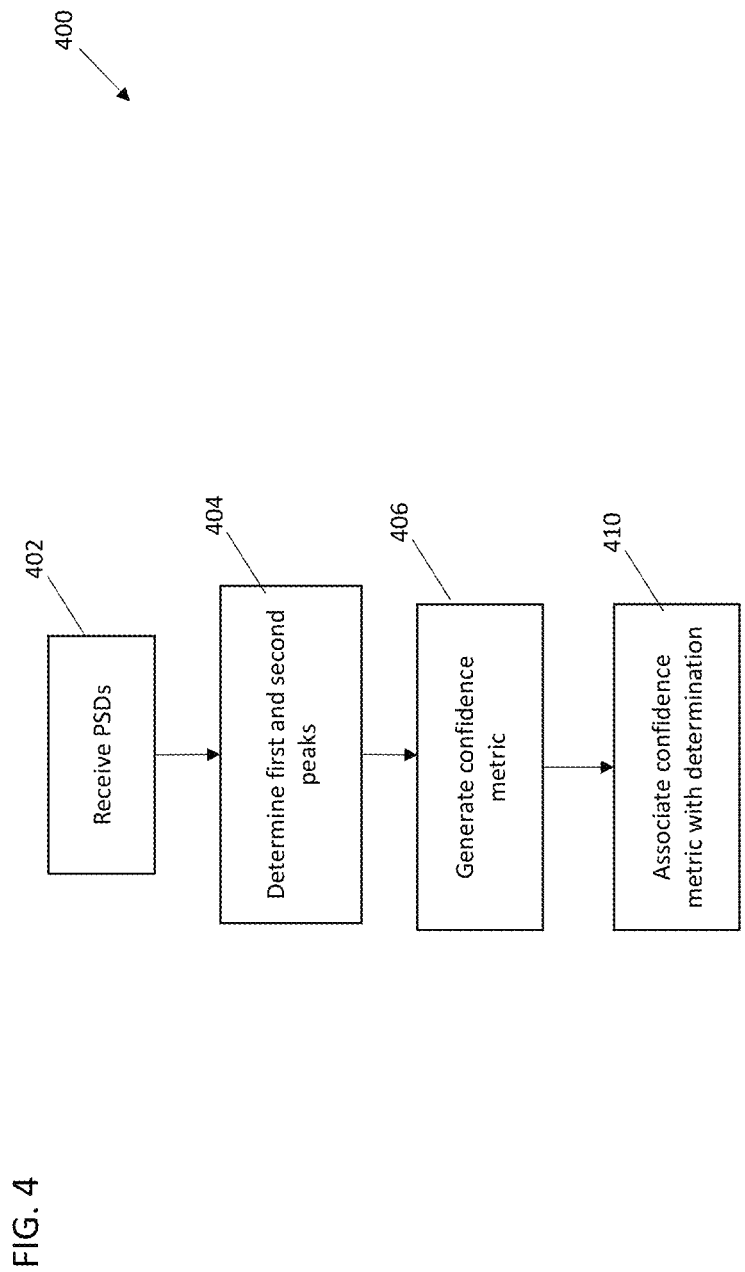
FIG. 4 illustrates an exemplary process for determining measurement confidence according to examples of the disclosure.

FIG. 4 illustrates an exemplary process for determining measurement confidence according to examples of the disclosure. In one or more examples, the process 400 of FIG. 4 can begin at step 402 wherein the PSDs generated at step 208 of FIG. 2A are received. Once received, the process 400 can move to step 402 wherein the maximum peaks of each PSD (in a certain frequency range depending on if the PSD is being used for heart rate or breathing rate) can be determined. Step 404 of process 400 can be substantially the same as step 210 of FIG. 2A, however, in one or more examples, rather than simply looking for the largest peak in a given frequency range, step 404 can include looking for the second highest peak as well. In an ideal or optimal example, if the PSD represented a perfect and infinitely long sinusoidal PPG signal, then there would likely only be one prominent peak in the PSD, since the only varying color in a pixel would be due to change in color engendered by the breathing rate or the heart rate. However, if the most prominent peak is accompanied by other peaks in the PSD that are at or near the same level (for instance if the PSD was taken for gaussian noise), as the most prominent peak, then the confidence in such a result would be low. Thus, by looking at the two highest peaks and comparing them (as described below), the process can assess the confidence of the measurement. Without such a confidence scoring, the determined heart rate or breathing rated based solely on the most prominent peak could lead to inaccurate determinations. Additionally, confidence metrics enable users to tailor both the example's setup and the placement of individuals to produce high-quality biometric estimates.

Once the first and second peaks have been determined for each PSD at step 404, the process 400 can move to step 406 wherein determined peaks can be used to generate a confidence metric. In one or more examples, the largest peak is normalized to 1, and the confidence can be calculated as follows:

$$\text{Confidence} = 1 - (\text{Second Largest Peak Max})$$

By normalizing to the highest peak and determining the relative height of the second peak, the "prominence" of the second peak can be used as a confidence metric. If the second largest peak has similar magnitude to the largest peak, then the confidence score is low, suggesting the presence of noise. If the second largest peak is very small compared to the largest peak, then the confidence metric is high, suggesting that the extracted signal is indicative of a periodic heart or respiratory rate signal. In one or more examples, once the confidence metric has been calculated at step 406, the process 400 can move to step 408 wherein the confidence score is associated with the PSD it was derived from, for instance, by appending the confidence score as metadata to the PSD. In this way, each PSD that is used to determine heart rate or respiratory rate can also have its confidence level taken into account. For instance, in the voting process described above with respect to FIG. 2A, instead of each PSD getting an equal vote, the votes can be weighted based on their associated confidence scores, with the PSDs with the highest confidence score getting the most weight in the voting process.

As described above with respect to FIG. 1, the system can use both thermal imaging data and color imaging data to make assessments regarding a subject being tested or viewed by the system. Thermal cameras provide information about the temperature of a subject. However, in order to make an accurate assessment, a reference blackbody may need to be imaged in the scene with the subject in order to provide a reference point to which the temperature of the subject can be compared. In one or more examples, an operator the system 100 of FIG. 1, using an image procured by the thermal camera 106 could manually indicate where the reference block body 112 is located in a scene, and that information can then be used to determine the temperature of the subject. However, requiring an operator to manually locate the blackbody reference in a thermal image frame can be prone to error in that the operator might make a mistake, or that the operator may not be accustomed to reading thermal images for the purpose of locating the reference blackbody 112. Thus, in one or more examples, automating the process of locating the blackbody 112 in a thermal image can lead to improved accuracy in any calculation or determination that is made based on a thermal image.

Figure 5:
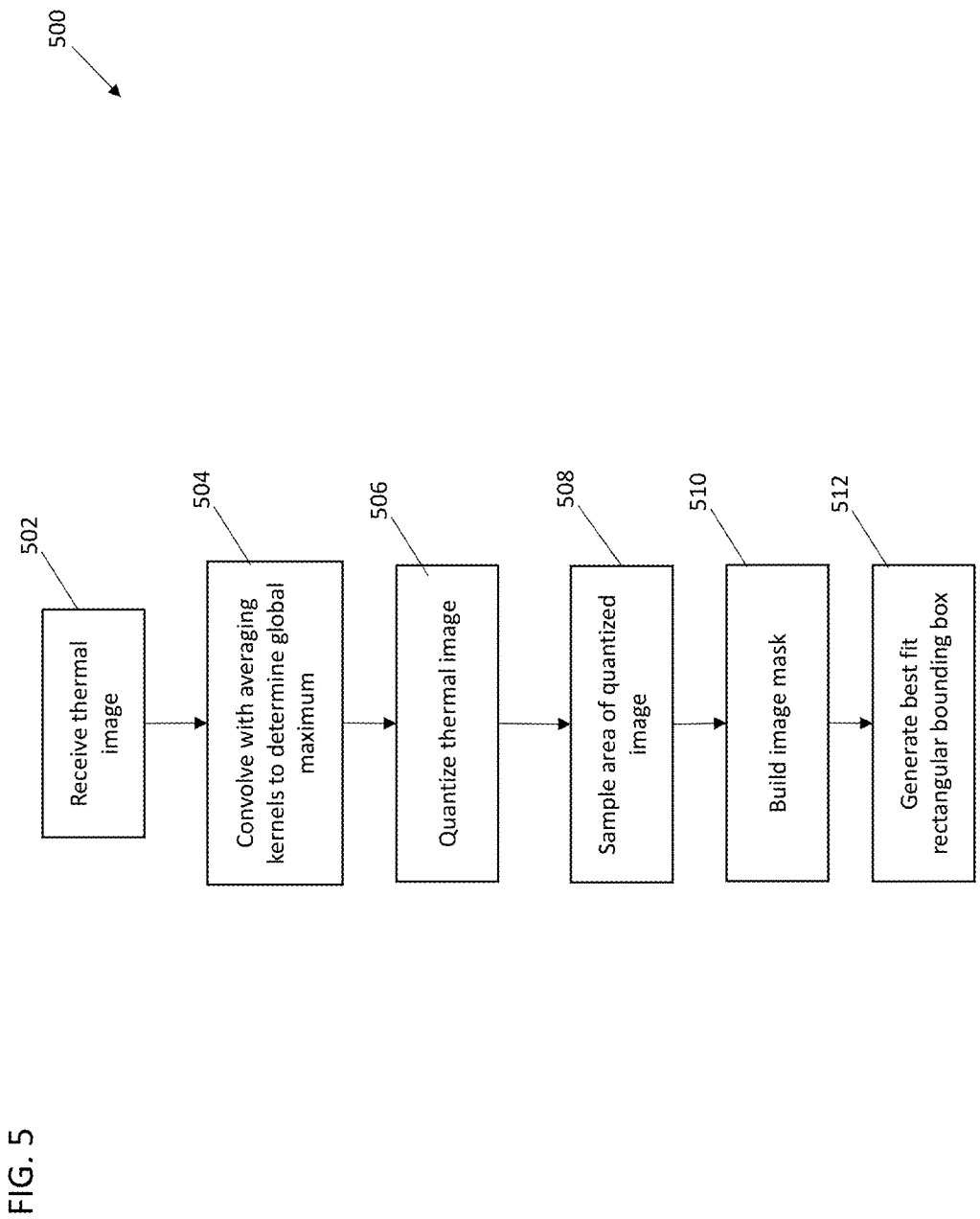
FIG. 5 illustrates an exemplary process for locating a reference blackbody in a thermal image according to examples of the disclosure.

FIG. 5 illustrates an exemplary process for locating a reference blackbody in a thermal image according to examples of the disclosure. In one or more examples, the process 500 of FIG. 5 can begin at step 502 wherein one or more grayscale thermal images are received from a thermal imaging camera that is configured to capture a scene, wherein the scene includes a reference blackbody as described above. In one or more examples, once the thermal image has been received at step 502, the process 500 can move to step 504 wherein the image is convolved with one or more averaging kernels of varying size to find the (x,y) coordinates of a global maximum output across all convolutions. Since the blackbody reference is a uniform warm region in a thermal image, convolving the image with a series of averaging kernels of various size and finding the global maximum result acts as a simple multi-scale feature detector for which the maximum output of all convolutions will likely correspond to the center of the reference blackbody in the image. Thus, in one or more examples, the output of step 504 can include an (x,y) coordinate that likely corresponds to the center of the reference blackbody found in the thermal image.

In one or more examples, once the (x,y) coordinate of the global maximum has been determined at step 504, the process 500 can move to step 506 wherein a non-uniform quantization algorithm is applied to the image. In one or more examples, the non-uniform quantization algorithm can divide the image into optimally spaced intensity bins to provide a minimum-error reconstruction of the full range of intensity values. In one or more examples, the number of quantization bins can be based on scene variance such that scenes with wide temperature ranges require more quantization bins to account for more scene content. In one or more examples, the quantization algorithm can be based on the Lloyd-Max quantizer, which can be operated iteratively with low memory and computational cost, and can operate in near-real-time.

In one or more examples, once the image has been quantized at step 506, the process 500 can move to step 508 wherein a plurality of sample areas can be created. In one or more examples, using the (x,y) coordinate estimate of the blackbody from above as a starting point, at step 506, a 5×5 sample neighborhood in the quantized image is generated, assigning the blackbody's class to the most common class in that neighborhood. In one or more examples, and in the event of a tie, the class of the blackbody is assigned as the highest-valued class, corresponding to the highest temperature in that local area.

In one or more examples, once the class for the blackbody has been assigned at step 508, the process 500 can move to step 510 wherein an image mask is created that applies one or more morphological operations to result in only the boundary edges of the blackbody. In one or more examples, a flood-fill algorithm can provide a filled region that roughly corresponds to the blackbody. The output of step 510 thus generates a rough shape of where the blackbody is in the image. In one or more examples, without knowledge a priori of the shape of the blackbody emitter, blackbody a dimension of a rectangular bounding box that is best inscribed in it is determined at step 512. In one or more examples, determining the bounding box can be considered as a differential evolution optimization problem in which the area inside the blackbody is maximized, without exceeding the bounds of the pre-drawn region generated at step 510. In one or more examples, the optimization algorithm can grow a rectangular bounding box from the centroid of the masked image region, evaluating the effective area of the box at each height and width combination and weighting the resulting score to prevent boxes from being grown into non-radiating regions of the image.

In one or more examples, and as described above, a blackbody reference can help to provide accurate temperature reading from a subject under analysis. However, in one or more examples, the accuracy assumes that the thermal image is able to accurately portray the difference between the blackbody reference temperature and the subject. For instance, if a particular pixel of a subject has an intensity value that is X amount greater than the reference blackbody pixel intensity, the difference can be accurately translated to a temperature difference, thus allowing the operator to determine the temperature of the subject. In one or more examples, allowing for the camera to be calibrated on scene (rather than using a factory calibration) can allow for any temperature readings using the thermal camera to be more accurate because any correction factors can take into account the temperature variations of the scene and environment that the system is operating in, as well as changes in distance between laboratory calibration setup and operational use.

Figure 6:
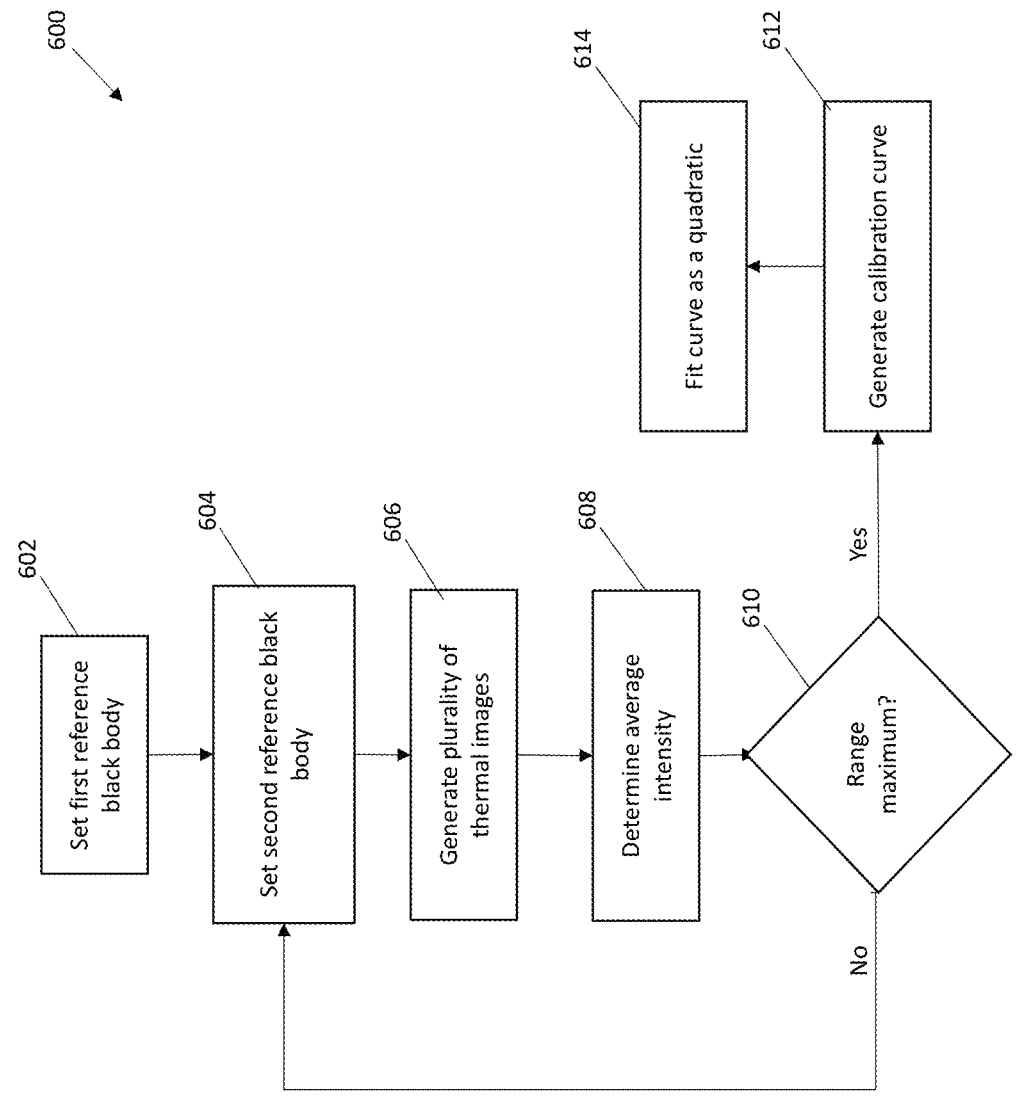
FIG. 6 illustrates an exemplary process for calibrating a thermal camera according to examples of the disclosure.

FIG. 6 illustrates an exemplary process for calibrating a thermal camera according to examples of the disclosure. In one or more examples, the process 600 of FIG. 6 can begin at step 602 wherein a first reference blackbody in the scene is set to a fixed value. In one or more examples, the fixed value can be 37° C. Once the first reference blackbody (which can also be referred to as the fixed reference blackbody) is set at step 602, the process 600 can move to step 604 wherein the second reference blackbody (also referred to as the varying reference blackbody) can be set to an initial temperature. As will be discussed below, the varying blackbody can be increased throughout the calibration procedure in a step by step manner to generate a calibration curve.

In one or more examples, once the second blackbody reference is set at step 604, the process 600 can move to step 606, wherein a plurality of thermal images are generated using the thermal camera viewing both black bodies that set at steps 602 and 604. In one or more examples, the plurality of images can be taken over a period of time, such that multiple images can be taken at the same combination of first and second reference blackbody temperatures. Once the plurality of images have been generated at step 606, the process 600 can move to step 608 wherein an average intensity of the second varying blackbody can be determined from the plurality of images generated at step 606. In one or more examples, the average intensity value can represent that average intensity of a pixel of the images taken at the location where the varying blackbody is located. In one or more examples, the location of the second blackbody is fixed and thus, the average intensity can be calculated by averaging the intensity values in the same location of each image. Upon completion of step 608 the known temperature of the varying blackbody can be associated with the calculated average pixel intensity.

In one or more examples, the second blackbody can be used to generate a "step" function of temperatures for calibration, operating in a set-and-hold in a range of temperatures surrounding the reference blackbody temperature and encompassing the entire plausible range of body temperature values. Temperature steps in this range provide sufficient resolution to build and validate the calibration of the infrared camera. In one or more examples, scene-based corrective function on the thermal camera can be disabled, as these interfere with temperature estimation in static scenes where both the camera and reference are fixed. Thus, once the average intensity value is determined for a given temperature of the second blackbody, at step 610 a determination can be made to see if the second blackbody is at the end of its test range. For instance if the range is between 35 and 43° C., then at step 610 a check can be made to see if the second blackbody is already set to 43° C. In one or more examples, if it is not set to the maximum, then the process 600 can revert to step 604 wherein the second blackbody temperature is set to a new fixed temperature at a fixed increment (such as 0.2° C.).

In one or more examples, if the range maximum has been achieved, then in one or more examples, the process 600 can move to step 612 wherein a calibration curve is generated. As discussed above for each temperature setting of the varying blackbody, a corresponding average pixel intensity can be calculated. Thus, in one or more examples a calibration curve can be generated by plotting each average intensity on the x-axis and its corresponding reference body temperature on the y-axis. Once the curve has been generated at step 612, the process 600 can move to step 614 wherein a quadratic fit is applied to the generated calibration curve. In one or more examples, the calibration curve is fit as a quadratic to the reference-subtracted output of the camera at every temperature step of the varying reference blackbody, converting camera digital numbers (DN) into temperature given an offset from a fixed reference blackbody. In one or more examples, the constant term of the quadratic can set to the temperature of the fixed reference blackbody to minimize error around that point, forcing the solver to optimize the gain terms in the vicinity of the reference.

In one or more examples, the dual-blackbody calibration can be performed in an automated process in a lab or production environment before deployment and setup, or it can be done in-scene with dual blackbodies for an on-the-fly calibration process that can be repeated intermittently to compensate for camera drift over time. Because of its reliance on the reference blackbody to accommodate for level shifts in the output of the thermal camera, the calibration process can be robust to both changes in ambient and camera temperature, as well as distances from the thermal camera to its reference blackbody in a temperature screening scenario. Calibrated cameras can result in approximately normally distributed errors in temperature estimation, with zero mean and standard deviation of 0.18° C. for test targets. These errors result from camera noise and slight drift of the reference blackbody.

In one or more examples, the calibration process of the system 100 of FIG. 1 can also include performing motion registration between the thermal camera 106 and the RGB camera 104. Motion registration can refer to the process of correlating motion detected in one camera with the same motion being viewed in the other camera. In one or more examples, the system 100 of FIG. 1 can utilize a high-resolution visible-light camera 104 to display live video to a screener, with the thermal imagery recorded by thermal camera 106 "hidden" to end-users. This can result in an easy-to-use system for which no additional thermography trainings are required for effective use. However, a key challenge is the location of humans within the thermal images. While thermal images provide useful content in the form of emitted radiance (or for calibrated cameras, temperature), they lack the rich scene content of visible-light cameras, making it more difficult to train high-quality, low-false-alarm detectors to accurately locate an individual in the thermal image. In one or more examples, the system 100 of FIG. 1 can circumvent this by applying human detection algorithms to color images, and then projecting those detections into the space of a thermal image. This approach allows for the use of advanced, mature algorithms and detectors, but requires that thermal images and visible images are co-aligned with high accuracy.

In one or more examples, a registration solution implemented by system 100 may require no additional calibration targets, and instead can use humans to generate tie-points in thermal and visible images. This approach can provide a fully "tool-less" camera registration solution that can be generated during system setup and optimized for every scene. In one or more examples, an individual enters the system's "registration mode", and then stands in the camera's field of view, waving their arms as the cameras capture data that is temporarily saved to disk. Registration can be performed on thermal and color image pairs, using a random subset of the images provided. In one or more examples, this yields a similar range of tie points as sequential images but requires only a fraction of the registration solutions to be generated, since random pairs effectively subsample the motion of the scene but provide enough variance for a robust registration solution. The resulting registration solutions, generated by solvers in openly available software, can be averaged to create the system's registration matrix. Once registration is complete, the registration solution is applied in real time to map the thermal images to the visible images, providing the necessary localization between the two modalities to perform temperature estimation.

Figure 7:
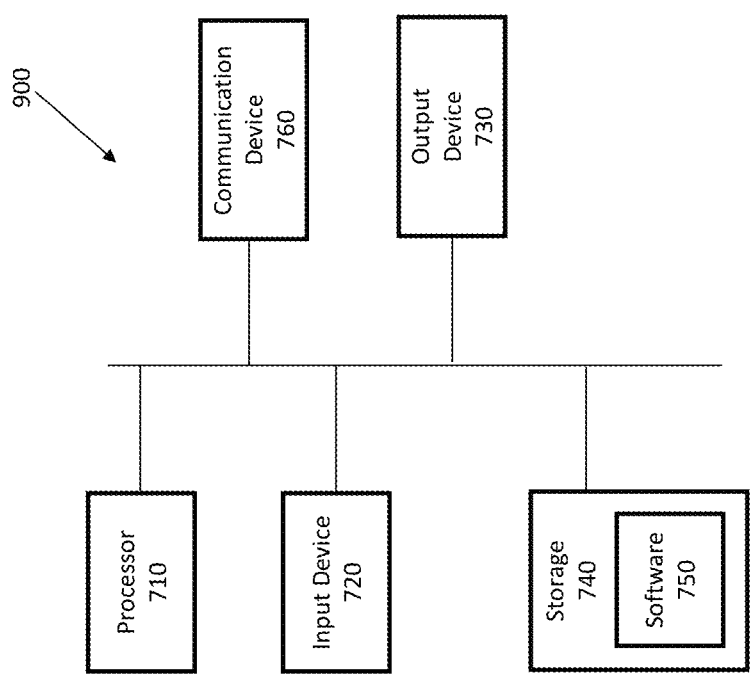
FIG. 7 illustrates an exemplary computing system, according to examples of the disclosure.

FIG. 7 illustrates an example of a computing system 700, in accordance with some examples of the disclosure. System 700 can be a client or a server. As shown in FIG. 7, system 700 can be any suitable type of processor-based system, such as a personal computer, workstation, server, handheld computing device (portable electronic device) such as a phone or tablet, or dedicated device. The system 700 can include, for example, one or more of input device 720, output device 730, one or more processors 710, storage 740, and communication device 760. Input device 720 and output device 730 can generally correspond to those described above and can either be connectable or integrated with the computer.

Input device 720 can be any suitable device that provides input, such as a touch screen, keyboard or keypad, mouse, gesture recognition component of a virtual/augmented reality system, or voice-recognition device. Output device 730 can be or include any suitable device that provides output, such as a display, touch screen, haptics device, virtual/augmented reality display, or speaker.

Storage 740 can be any suitable device that provides storage, such as an electrical, magnetic, or optical memory including a RAM, cache, hard drive, removable storage disk, or other non-transitory computer readable medium. Communication device 760 can include any suitable device capable of transmitting and receiving signals over a network, such as a network interface chip or device. The components of the computing system 700 can be connected in any suitable manner, such as via a physical bus or wirelessly.

Processor(s) 710 can be any suitable processor or combination of processors, including any of, or any combination of, a central processing unit (CPU), graphics processing unit (GPU), field programmable gate array (FPGA), and application-specific integrated circuit (ASIC). Software 750, which can be stored in storage 740 and executed by one or more processors 710, can include, for example, the programming that embodies the functionality or portions of the functionality of the present disclosure (e.g., as embodied in the devices as described above)

Software 750 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 740, that can contain or store programming for use by or in connection with an instruction execution system, apparatus, or device.

Software 750 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport computer readable medium can include, but is not limited to, an electronic, magnetic, optical, electromagnetic, or infrared wired or wireless propagation medium.

System 700 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 700 can implement any operating system suitable for operating on the network. Software 750 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated. For the purpose of clarity and a concise description, features are described herein as part of the same or separate embodiments; however, it will be appreciated that the scope of the disclosure includes embodiments having combinations of all or some of the features described.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method for measuring a heart rate and breathing rate of a subject using video imaging data, the method comprising:
   receiving video data from a visible spectrum camera, wherein the video data includes images of a subject to be tested, wherein the received video data comprises a plurality of frames, and wherein each frame of the plurality of frames includes a plurality of pixels;
   identifying a region of interest in the received video data, wherein the region of interest includes one or more pixels of the plurality of pixels for each frame of the plurality of frames;
   computing a power spectral density for each pixel of the plurality of pixels in the identified region of interest;
   for a first frequency range, identifying a peak value for each computed power spectral density;
   for a second frequency range, identifying a peak value for each computed power spectral density;
   determining a heart rate of the subject based on identifying which identified peak value associated with the first frequency range occurs most frequently across all identified peak values associated with the first frequency range; and
   determining a respiratory rate of the subject based on identifying which identified peak value associated with the second frequency range occurs most frequently across all identified peak values associated with the second frequency range.

2. The method of claim 1, wherein identifying a region of interest in the received video data comprises determining a location of the subject's face in the received video.

3. The method of claim 1, wherein the method comprises generating one or more confidence scores for the generated heart rate and the generated respiratory rate, wherein generating once or more confidence scores comprises:
   for the first frequency range, identifying a second peak value for each computed power spectral density;
   for the second frequency range, identifying a second peak value for each computed power spectral density;
   generating a heart rate confidence score based on the identified peak value and identified second peak value associated with the first frequency range for each computed power spectral density; and
   generating a breathing rate confidence score based on the identified peak value and identified second peak value associated with the second frequency range for each computed power spectral density.

4. The method of claim 1, wherein each pixel of the plurality of pixels includes one or more color channels, and wherein computing a power spectral density for each pixel of the plurality of pixels in the identified region of interest comprises computing a power spectral density for each color channel of the one or more color channels.

5. The method of claim 1, wherein each power spectral density represents a variation in a color channel of an associated pixel with respect to frequency.

6. The method of claim 1, further comprising removing noise from each computed power spectral density after said computing.

7. The method of claim 1, further comprising determining an emotional state of the subject based on the determined heart rate and determined respiratory rate.

8. A method for measuring a heart rate and breathing rate of a subject using video imaging data, the method comprising:
   receiving video data from a visible spectrum camera, wherein the video data includes images of a subject to be tested, wherein the received video data comprises a plurality of frames, and wherein each frame of the plurality of frames includes a plurality of pixels;
   identifying a region of interest in the received video data, wherein the region of interest includes one or more pixels of the plurality of pixels for each frame of the plurality of frames, wherein identifying a region of interest in the received video data comprises determining a location of the subject's face in the received video, wherein determining a location of the subject's face in the received video comprises:
      applying one or more machine learning classifiers to the received video data to determine the location of one or more anatomical landmarks of the subject;
      determining the location of the subject's face based on the determined location of the one or more anatomical landmarks of the subject; and
      generating a bounding box for the region on interest on the received video data based on the determined location of the subject's face;
   computing a power spectral density for each pixel of the plurality of pixels in the identified region of interest;
   for a first frequency range, identifying a peak value for each computed power spectral density;
   for a second frequency range, identifying a peak value for each computed power spectral density;
   determining a heart rate of the subject based on the identified peak value associated with the first frequency range for each computed power spectral density; and
   determining a respiratory rate of the subject based on the identified peak value associated with the second frequency range for each computed power spectral density.

9. The method of claim 8, wherein the one or more machine learning classifiers determine the location of one or more anatomical landmarks of the subject using full-body pose detection.

10. The method of claim 8, wherein the one or more anatomical landmarks comprise one or more joints of the subject.

11. The method of claim 8, wherein the one or more anatomical landmarks comprise one or more of a noise, an eye, an ear, and a shoulder of the subject.

12. A system for measuring a heart rate and breathing rate of a subject using video imaging data, the system comprising:
   a memory;
   one or more processors;
   wherein the memory stores one or more programs that when executed by the one or more processors, cause the one or more processors to:
      receive video data from a visible spectrum camera, wherein the video data includes images of a subject to be tested, wherein the received video data comprises a plurality of frames, and wherein each frame of the plurality of frames includes a plurality of pixels;

identify a region of interest in the received video data, wherein the region of interest includes one or more pixels of the plurality of pixels for each frame of the plurality of frames;

compute a power spectral density for each pixel of the plurality of pixels in the identified region of interest;

for a first frequency range, identify a peak value for each computed power spectral density;

for a second frequency range, identify a peak value for each computed power spectral density;

determine a heart rate of the subject based on identifying which identified peak value associated with the first frequency range occurs most frequently across all identified peak values associated with the first frequency range; and determine a respiratory rate of the subject based on identifying which identified peak value associated with the second frequency range occurs most frequently across all identified peak values associated with the second frequency range.

13. The system of claim 12, wherein identifying a region of interest in the received video data comprises determining a location of the subject's face in the received video.

14. The system of claim 12, wherein the one or more processors are caused to generate one or more confidence scores for the generated heart rate and the generated respiratory rate, wherein generating once or more confidence scores comprises:

for the first frequency range, identifying a second peak value for each computed power spectral density;

for the second frequency range, identifying a second peak value for each computed power spectral density;

generating a heart rate confidence score based on the identified peak value and identified second peak value associated with the first frequency range for each computed power spectral density; and generating a breathing rate confidence score based on the identified peak value and identified second peak value associated with the second frequency range for each computed power spectral density.

15. The system of claim 12, wherein each pixel of the plurality of pixels includes one or more color channels, and wherein computing a power spectral density for each pixel of the plurality of pixels in the identified region of interest comprises computing a power spectral d for each color channel of the one or more color channels.

16. A system for measuring a heart rate and breathing rate of a subject using video imaging data, the system comprising:

a memory;

one or more processors;

wherein the memory stores one or more programs that when executed by the one or more processors, cause the one or more processors to:

receive video data from a visible spectrum camera, wherein the video data includes images of a subject to be tested, wherein the received video data comprises a plurality of frames, and wherein each frame of the plurality of frames includes a plurality of pixels;

identify a region of interest in the received video data, wherein the region of interest includes one or more pixels of the plurality of pixels for each frame of the plurality of frames, wherein identifying a region of interest in the received video data comprises determining a location of the subject's face in the received video and determining a location of the subject's face in the received video comprises:

applying one or more machine learning classifiers to the received video data to determine the location of one or more anatomical landmarks of the subject;

determining the location of the subject's face based on the determined location of the one or more anatomical landmarks of the subject; and generating a bounding box for the region on interest on the received video data based on the determined location of the subject's face;

compute a power spectral density for each pixel of the plurality of pixels in the identified region of interest;

for a first frequency range, identify a peak value for each computed power spectral density;

for a second frequency range, identify a peak value for each computed power spectral density;

determine a heart rate of the subject based on the identified peak value associated with the first frequency range for each computed power spectral density; and determine a respiratory rate of the subject based on the identified peak value associated with the second frequency range for each computed power spectral density.

17. The system of claim 16, wherein the one or more machine learning classifiers are configured to determine the location of one or more anatomical landmarks of the subject using full-body pose detection.

18. The system of claim 16, wherein the one or more anatomical landmarks comprise one or more joints of the subject.

19. The system of claim 16, wherein the one or more anatomical landmarks comprise one or more of a noise, an eye, an ear, and a shoulder of the subject.

20. A non-transitory computer readable storage medium storing one or more programs for measuring a heart rate and breathing rate of a subject using video imaging data, the programs for execution by one or more processors of an electronic device that when executed by the device, cause the device to:

receive video data from a visible spectrum camera, wherein the video data includes images of a subject to be tested, wherein the received video data comprises a plurality of frames, and wherein each frame of the plurality of frames includes a plurality of pixels;

identify a region of interest in the received video data, wherein the region of interest includes one or more pixels of the plurality of pixels for each frame of the plurality of frames;

compute a power spectral density for each pixel of the plurality of pixels in the identified region of interest;

for a first frequency range, identify a peak value for each computed power spectral density;

for a second frequency range, identify a peak value for each computed power spectral density;

determine a heart rate of the subject based on identifying which identified peak value associated with the first frequency range occurs most frequently across all identified peak values associated with the first frequency range; and determine a respiratory rate of the subject based on identifying which identified peak value associated with the second frequency range occurs most frequently across all identified peak values associated with the second frequency range.

21. The system of claim 20, wherein identifying a region of interest in the received video data comprises determining a location of the subject's face in the received video.

22. The non-transitory computer readable storage medium of claim 20, wherein the device is caused to generate one or more confidence scores for the generated heart rate and the generated respiratory rate, wherein generating once or more confidence scores comprises:
for the first frequency range, identifying a second peak value for each computed power spectral density;
for the second frequency range, identifying a second peak value for each computed power spectral density;
generating a heart rate confidence score based on the identified peak value and identified second peak value associated with the first frequency range for each computed power spectral density; and
generating a breathing rate confidence score based on the identified peak value and identified second peak value associated with the second frequency range for each computed power spectral density.

23. The non-transitory computer readable storage medium of claim 20, wherein each pixel of the plurality of pixels includes one or more color channels, and wherein computing a power spectral density for each pixel of the plurality of pixels in the identified region of interest comprises computing a power spectral density for each color channel of the one or more color channels.

24. A non-transitory computer readable storage medium storing one or more programs for measuring a heart rate and breathing rate of a subject using video imaging data, the programs for execution by one or more processors of an electronic device that when executed by the device, cause the device to:
receive video data from a visible spectrum camera, wherein the video data includes images of a subject to be tested, wherein the received video data comprises a plurality of frames, and wherein each frame of the plurality of frames includes a plurality of pixels;
identify a region of interest in the received video data, wherein the region of interest includes one or more pixels of the plurality of pixels for each frame of the plurality of frames, wherein identifying a region of interest in the received video data comprises determining a location of the subject's face in the received video and wherein determining a location of the subject's face in the received video comprises:
applying one or more machine learning classifiers to the received video data to determine the location of one or more anatomical landmarks of the subject;
determining the location of the subject's face based on the determined location of the one or more anatomical landmarks of the subject; and
generating a bounding box for the region on interest on the received video data based on the determined location of the subject's face;
compute a power spectral density for each pixel of the plurality of pixels in the identified region of interest;
for a first frequency range, identify a peak value for each computed power spectral density;
for a second frequency range, identify a peak value for each computed power spectral density:
determine a heart rate of the subject based on the identified peak value associated with the first frequency for each computed power spectral density; and
determine a respiratory rate of the subject based on the identified peak value associated with the second frequency range for each computed power spectral density.

* * * * *